United States Patent
Roberts et al.

(10) Patent No.: US 8,266,536 B2
(45) Date of Patent: Sep. 11, 2012

(54) PHYSICAL-VIRTUAL ENVIRONMENT INTERFACE

(75) Inventors: Michael Roberts, Los Gatos, CA (US); Nicolas B. Ducheneaut, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 905 days.

(21) Appl. No.: 12/274,695

(22) Filed: Nov. 20, 2008

(65) Prior Publication Data

US 2010/0125799 A1    May 20, 2010

(51) Int. Cl.
*G06F 3/048* (2006.01)
*G06F 3/00* (2006.01)

(52) U.S. Cl. .................. 715/757; 715/706; 715/751

(58) Field of Classification Search .............. 715/706, 715/751, 757
See application file for complete search history.

(56) References Cited

U.S. PATENT DOCUMENTS

| | | | |
|---|---|---|---|
| 5,500,671 A * | 3/1996 | Andersson et al. | 348/14.1 |
| 6,492,986 B1 * | 12/2002 | Metaxas et al. | 345/420 |
| 6,806,898 B1 * | 10/2004 | Toyama et al. | 348/14.16 |
| 7,532,230 B2 * | 5/2009 | Culbertson et al. | 348/14.08 |
| 2003/0043153 A1 * | 3/2003 | Buddemeier et al. | 345/473 |
| 2003/0234859 A1 * | 12/2003 | Malzbender et al. | 348/14.05 |
| 2004/0128350 A1 * | 7/2004 | Topfl et al. | 709/204 |
| 2006/0184355 A1 * | 8/2006 | Ballin et al. | 704/8 |
| 2007/0014485 A1 * | 1/2007 | McAlpine et al. | 382/276 |
| 2007/0230794 A1 * | 10/2007 | McAlpine et al. | 382/190 |
| 2008/0297589 A1 * | 12/2008 | Kurtz et al. | 348/14.16 |
| 2009/0089685 A1 * | 4/2009 | Mordecai et al. | 715/757 |
| 2009/0158160 A1 * | 6/2009 | Alberth et al. | 715/733 |
| 2009/0271821 A1 * | 10/2009 | Zalewski | 725/37 |

OTHER PUBLICATIONS

Peter Eisert, "Immersive 3D video conferencing: challenges, concepts, and implementation", Proc. SPIE 5150, 69 (2003).*
Jeremy N. Bailenson, Nick Yee, Dan Merget, and Ralph Schroeder. 2006. The Effect of Behavioral Realism and Form Realism of Real-Time Avatar Faces on Verbal Disclosure, Nonverbal Disclosure, Emotion Recognition, and Copresence in Dyadic Interaction. Presence: Teleoper. Virtual Environ. 15, 4 (Aug. 2006), 359-372.*
Ken-Ichi Okada, Fumihiko Maeda, Yusuke Ichikawaa, and Yutaka Matsushita. 1994. Multiparty videoconferencing at virtual social distance: MAJIC design. In Proceedings of the 1994 ACM conference on Computer supported cooperative work (CSCW '94). ACM, New York, NY, USA, 385-393.*

(Continued)

*Primary Examiner* — Adam M Queler
*Assistant Examiner* — Andrea Long
(74) *Attorney, Agent, or Firm* — Shun Yao; Park, Vaughan, Fleming & Dowler LLP

(57) ABSTRACT

Apparatus, methods, and computer-program products are disclosed for automatically interfacing a first physical environment and a second physical environment to a virtual world model where some avatar controller piloting commands are automatically issued by a virtual world client to a virtual world server responsive to the focus of the avatar controller.

20 Claims, 7 Drawing Sheets

OTHER PUBLICATIONS

Peter Kauff and Oliver Schreer. 2002. An immersive 3D video-conferencing system using shared virtual team user environments. In Proceedings of the 4th international conference on Collaborative virtual environments (CVE '02). ACM, New York, NY, USA, 105-112.*

Tanger, Kauff, Schreer, Pavy, Dit Picard, and Saugis: Team Collaboration Mixing Immersive Video Conferencing with Shared Virtual 3D Objects,Proceedings of Tyrrhenian International Workshop on Digital Communications Distributed Cooperative Laboratories—Issues in Networking, Instrumentation and Measurements, Sorento, Italy, Jul. 2005.*

Regenbrecht H,Haller M,Hauber J, BillinghurstM(2006) Carpeno: interfacing remote collaborative virtual environmentswith table-top interaction. Virtual Real Syst Dev Appl 10(2):95-107.*

F. Isgrò, E. Trucco, P. Kauff and O. Schreer, Three-dimensional image processing in the future of immersive media. IEEE Transactions on Circuits and Systems for Video Technology, 14 3 (2004), pp. 288-303.*

* cited by examiner

PHYSICAL-VIRTUAL ENVIRONMENT INTERFACE

BACKGROUND

1. Technical Field

This disclosure is generally related to virtual environments. More specifically, this disclosure is related to an interface between physical environments and a virtual environment.

2. Related Art

Machine vision systems have the capability of performing three-dimensional tracking of real-world objects in a physical environment. These systems can use: multiple video cameras as input to a computerized model of the physical environment and the tracked real-world objects, reflective patches to track real-world objects of interest, magnetic motion capture technology, etc. Generating a computer model of the physical environment and real-world objects in the physical environment has become less complex with the advent of three-dimensional video cameras (such as the Z-Cam™ video camera from 3DV Systems). Such video cameras and other tracking devices will continue to become smaller and cheaper and, thus, machine vision systems will become more available.

Virtual reality systems are computer-generated virtual environments (usually three-dimensional) within which virtual objects interact. These virtual objects can represent real-world objects. The interaction between the virtual objects is generally defined by the characteristics of the virtual objects and the physics model used in the area of the virtual environment within which the interaction occurs. Avatars are virtual objects in the virtual environment that are piloted by avatar controllers (who are generally humans). Simulated interactable objects are virtual objects that are not controlled by avatar controllers (for example, a "non-player character" (NPC) in gaming systems) and have programmed responses to interactions with other virtual objects. A virtual object representation of a virtual object (such as an avatar representation of an avatar) can be presented via a display device that serves as a viewport into the virtual world model for the avatar controller. Some virtual environments simulate audio and climate effects. These environmental effects can be presented to the avatar controllers. A virtual environment can also allow the avatar controller to cause audio (such as the avatar controller's voice) to be emitted by the piloted avatar and heard by the avatar controllers of other avatars.

Virtual reality systems generally have a virtual world server that communicates with a number of virtual world clients. The virtual world server maintains the virtual world model and communicates with the separate virtual world clients. Each of the virtual world clients renders a view on a viewport from a viewpoint (a virtual camera) placed within the virtual world model for that viewport. The virtual world client accepts piloting commands from an avatar controller and can send the piloting commands to the virtual world server. The virtual world server receives the piloting commands, updates the virtual environment accordingly and makes the resulting changes in the virtual environment available to the virtual world clients for presentation. Examples of virtual world server-virtual world client systems include Linden Lab's Second Life® virtual world and Activision Blizzard, Inc.'s World of WarCraft® virtual world.

The virtual environment generally provides a limited (but often rich) set of piloting commands that can be used by the avatar controller to pilot the avatar. These piloting commands can include avatar movement commands, emotion commands, action commands, avatar state commands, communication commands, etc. Communication commands can include private conversations ("/whisper"), group public conversations ("/say"), large group public conversations ("/yell"), private group conversations ("/guild"), etc.; can include social interaction commands such as ("/wave"), ("/bow"), ("/smile"), etc.; and can include emotion state commands such as ("/happy"), ("/sad"), etc. The textual form of the piloting command is often converted into a binary form by the virtual world client prior to transmission to the virtual world server. In some virtual environments, the avatar includes a mask that represents the avatar's face. The mask can be distorted responsive to social interaction commands. The action performed by the avatar in response to a piloting command is generally an animation. One skilled in the art will understand that the avatar's mask, body, body-parts, etc., can be implemented by a weighted mesh or set of weighted meshes and set of bones with corresponding textures and lighting. Likewise, meshes with associated morph targets can be used to implement avatar facial expressions and animations. Such a one will also understand that there exist other approaches to implement avatar actions.

The avatar can automatically respond to events (including random or periodic timer events) in the virtual environment if programmed to do so (for example, by using macros, personality programs, etc.). The avatar can be piloted by the avatar controller to perform directed actions to another virtual object in the virtual world model ("/wave at X"), or non-directed actions ("/wave"). Automatic avatar responses to particular interactions in the virtual world model can be modified by an emotion state that the avatar controller can assign to the avatar. These piloting commands and responses can change the avatar's mask. While avatars are generally human shaped, they can have any shape. However, generally an observer of an avatar can determine which direction the avatar is "facing" in the virtual world model.

Generally, the avatar controller pilots the avatar using keyboard input (or equivalent, such as a joystick, voice to text, etc.). Communication of the avatar controller via the avatar is often by keyboarded chat text. Sometimes the avatar controllers use VOIP technology to communicate. Systems exist that map elementary cues (such as facial expressions) of the avatar controller onto the avatar's mask. These systems work well for some social cues (those that are not directed between avatar controllers or targeted to a specific avatar) but are insufficient for a realistic interaction between the avatar controllers using the virtual environment.

Virtual environments are currently used to simulate in-person participation in professional meetings. In these situations avatars piloted by the meeting participants meet at some location in the virtual environment. Thus, the meeting participants do not need to travel to a location in the physical world to meet. One example of virtual conferencing is Conference Island in the Second Life® virtual world.

One of the advantages of a physical meeting is that the social interactions between the meeting participants can be observed and interpreted by the participants. Video conferencing technology attempts, but fails, to provide an equivalent social interaction between participants of a video conference. Virtual conferences (meetings held in virtual environments) have the potential of providing a fuller social interaction capability than video conferencing. However, that potential is not realized because of the additional effort required by the avatar controller in providing social cues. Thus, in a virtual conference, the attention of the avatar controller is split between the avatar controller's need to pilot the avatar and the content of the meeting. If the avatar controller does not actually pilot the avatar, social hints that are needed to replicate an in-person meeting in the physical environment are not provided by the avatar—to the detriment of the virtual conference. However, the need to pilot the avatar can take the avatar controller's attention away from the meeting and, thus, the avatar controller can lose the context of the virtual conference—to the detriment of the virtual conference.

Machine vision systems can include eye-tracker and/or gaze-tracker capability to detect what direction an individual in the physical environment is looking. An eye-tracker monitors motion of an individual's eye. A gaze-tracker monitors where an individual is looking and often includes an eye-tracker capability. For example, a non-invasive eye-tracker typically uses infrared light reflected from the eye and sensed by a video camera. The video image can be analyzed to extract eye rotation from changes in reflections. Video-based eye trackers typically use the Purkinje images and the center of the pupil as features to track. This technology is known in the art, and commercially available systems (such as the faceLAB® technology from Seeing Machines, ViewPoint EyeTracker® from Arrington Research, as well as others). Some of these systems track both facial expression and eye position. The gaze can be determined from the eye position and the face position.

When interfacing between a physical environment and a virtual environment, social interaction cues from one avatar controller to another avatar controller in the same physical environment are not captured in the virtual environment. Furthermore, the discrepancy between the relative physical position of avatar controllers in the physical environment and their corresponding avatars in the virtual environment means it is common to target the wrong avatar when automatically issuing piloting commands from a machine vision system. For example, assume a virtual conference where a first avatar controller pilots a first avatar and where a group of avatar controllers in a shared physical environment (that is not the same physical environment of the first avatar controller) pilots their set of avatars. Because the spatial relationship between any given avatar controller and the avatar of another given avatar controller can vary, attempting to directly map avatar controller movements captured by a machine vision system is often in error and social cues are directed to the wrong avatar. These errors can lead to miscommunication and misinterpretation by others in the virtual conference.

DETAILED DESCRIPTION

Figure 1:
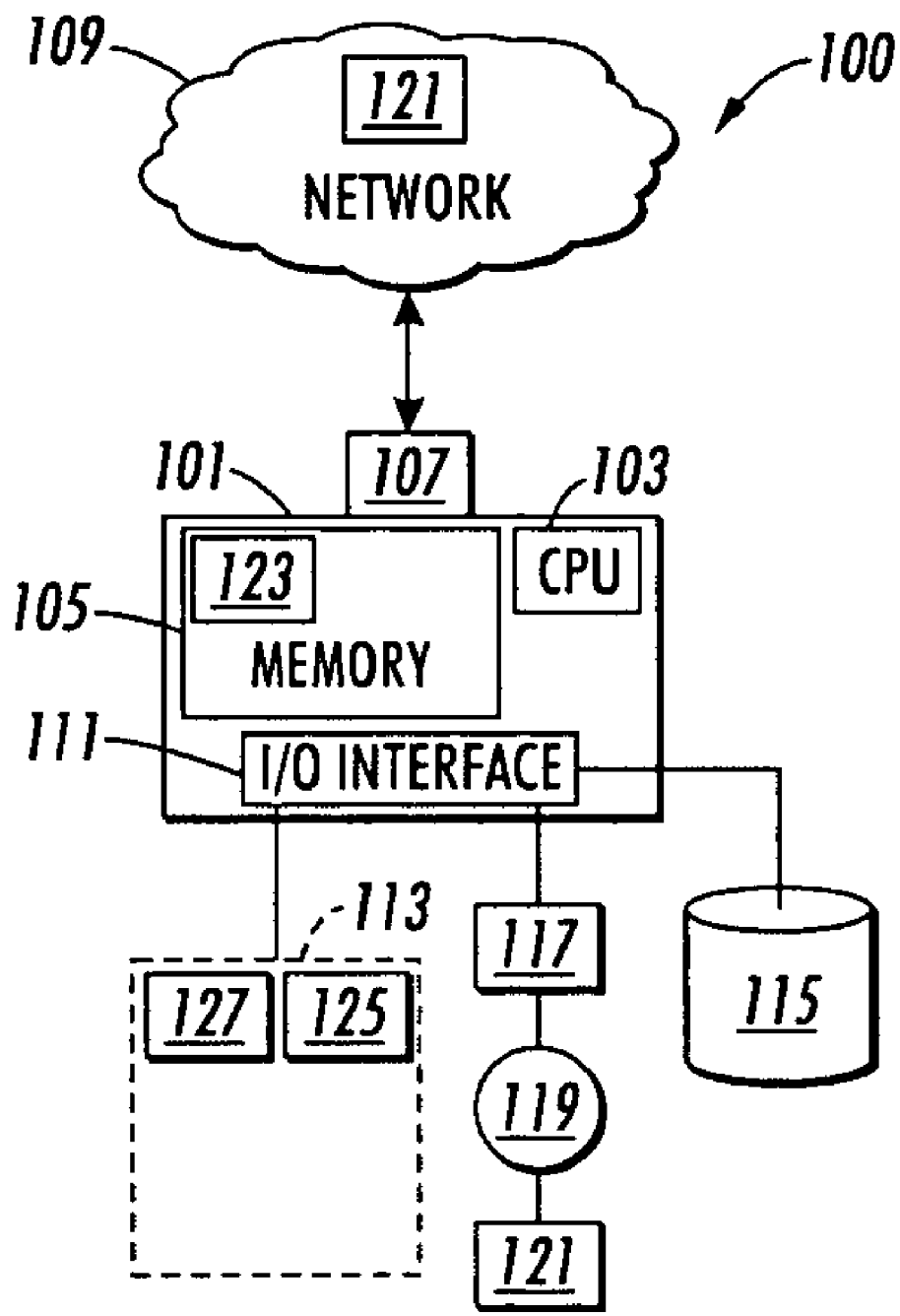
FIG. 1 illustrates a networked computer system that can be used with a client-server virtual environment system.

The technology disclosed herein teaches a computer-controlled method for automatically interfacing a first physical environment and a second physical environment to a virtual world model. The virtual world model includes a first avatar that represents a first avatar controller in the first physical environment, a second avatar that represents a second avatar controller in the second physical environment, and a third avatar that represents a third avatar controller. The first physical environment includes a gaze-tracker and a first viewport. The second physical environment includes a second viewport. The first avatar and the second avatar include a first avatar eye and a second avatar eye respectively. The method detects, within the first physical environment, a virtual gaze object from the first avatar controller to a target and determines which of the second avatar or the third avatar is associated with the target. The method automatically emits a focus-on piloting command to the virtual world model. The focus-on piloting command is configured to aim the first avatar eye to the second avatar or the third avatar in the virtual world model responsive to the determining. Apparatus that perform the method, and program products that contain computer instructions that, when executed by the computer, cause the computer to perform the method, are also disclosed.

The disclosed technology provides an automatic way for the avatar controller to pilot the avatar and for the avatar controller to interact naturally in a virtual conference with meeting participants who are not in the same physical environment with the avatar controller. In addition, avatar controllers physically present in one separate physical environment are exposed to the social interaction cues that occur in another physical environment, as well as being exposed to the social interaction cues that occur between the avatar controllers in different physical environments who interact only through the virtual environment.

The following description is presented to enable any person skilled in the art to make and use the disclosed technology, and is provided in the context of a particular application and its requirements. Various modifications to the disclosed embodiments will be readily apparent to those skilled in the art, and the general principles defined herein may be applied to other embodiments and applications without departing from the spirit and scope of the claims. Thus, the presently disclosed technology is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be completely or partially included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

One skilled in the art will understand that issues related to lost communications between computers described herein will be ignored for clarity in the following description.

FIG. 1 illustrates a networked computer system 100 that can incorporate the technology described herein. The networked computer system 100 includes a computer 101 that incorporates a CPU 103, a memory 105, and a network interface 107. The network interface 107 provides the computer 101 with access to a network 109. The computer 101 also includes an I/O interface 111 that can be connected to a user interface device(s) 113, a storage system 115, and a removable data device 117. The removable data device 117 can read a computer-usable data carrier 119 (such as a fixed or replaceable ROM within the removable data device 117 itself (not shown), as well as a computer-usable data carrier that can be inserted into the removable data device 117 itself (such as a memory stick, CD, floppy, DVD or any other tangible media)) that typically contains a program product 121. The user interface device(s) 113 can include a viewport 125, machine vision system instrumentation 127, and user input devices (not shown). The computer 101 executing the program 123 can communicate to another computer using the network 109. The viewport 125 can be any device that can present an image (for example, a CRT display, LCD display, etc.).

The storage system 115 (along with the removable data device 117), the computer-usable data carrier 119, and, in some cases, the network 109 comprise a file storage mechanism. The program product 121 on the computer-usable data carrier 119 is generally read into the memory 105 as a program 123 which instructs the CPU 103 to perform specified operations. In addition, the program product 121 can be provided from devices accessed using the network 109. One skilled in the art will understand that the network propagates information (such as data that defines a computer program). Signals can be propagated using electromagnetic signals, visible or invisible light pulses, signals on a data bus, or signals transmitted over any wire, wireless, or optical fiber technology that allows information to be propagated from one point to another. Programs and data are commonly read from both tangible physical media (such as those listed above) and from the network 109. Thus, the network 109, like a tangible physical media, can be a computer-usable data carrier. One skilled in the art will understand that not all of the displayed features of the computer 101 need to be present in all embodiments that implement the techniques disclosed herein. Further, one skilled in the art will understand how to adjust the configuration of the computer 101 for the role it has in a client-server environment. Such a one will also understand that computers are ubiquitous within modern devices ranging from cell phones to vehicles to kitchen appliances, etc.

Figure 2:
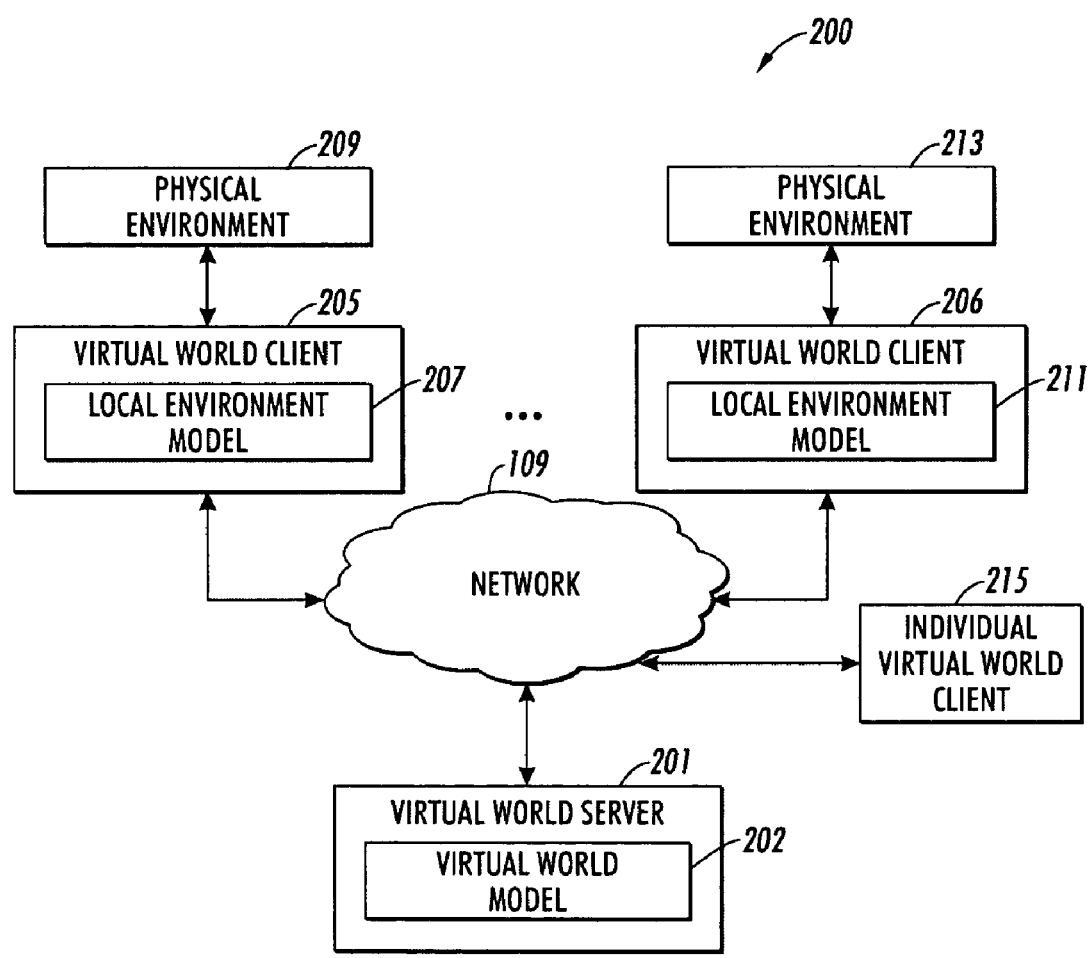
FIG. 2 illustrates an architecture overview.

FIG. 2 illustrates an architecture overview 200 that includes a virtual world server 201 that maintains a virtual world model 202 and is in communication with the network 109. A first virtual world client 205 and/or an Nth virtual world client 206 can communicate with the virtual world server 201 over the network 109. The first virtual world client 205 can contain a first local environment model 207 that can maintain a model of avatar controller(s), and real-world objects in the first physical environment 209; similarly the Nth virtual world client 206 can maintain a second local environment model 211 for an Nth physical environment 213.

The virtual world server 201 can also communicate with an individual virtual world client 215 having a physical environment defined by an avatar controller located in front of a viewport equipped with a gaze-tracker (and can include a face-tracker). Thus, the physical environment (not shown) for the individual virtual world client 215 need only include the eye/face of the avatar controller. Thus, the individual virtual world client 215 maintains a correspondingly limited local environment model. The technology described herein, which is directed toward the first physical environment 209 and the first local environment model 207, can also be applied to the physical environment and local environment model of the individual virtual world client 215 by one skilled in the art without undue experimentation after having read the disclosure herein.

Changes of the real-world objects in the first physical environment 209 or the Nth physical environment 213 can be reflected in the first local environment model 207 or the second local environment model 211 respectively. These changes are propagated to the virtual world server 201 through the respective virtual world client. The virtual world server 201 updates the virtual world model 202 responsive to the propagated changes and provides updated information to the first virtual world client 205 and/or the Nth virtual world client 206. On receiving the update from the virtual world server 201, the virtual world clients update, if needed, their local environment model. As the local environment models are updated, presentations of the virtual world model 202 in viewports controlled by the first virtual world client 205, the Nth virtual world client 206, and the individual virtual world client 215 are updated accordingly. The viewport driven by the local environment model generally does not present representations of virtual objects that are analogs of the real-world objects in the same physical environment as the viewport.

The first local environment model 207 models relevant real-world objects in the first physical environment 209. These relevant real-world objects can include avatar controllers (for example, their locations, the positions of their body-parts, their facial features, viewports, their view cone, their utterances, etc.), designated real-world objects (for example, a human that is not an avatar controller, a cup, a book, a device, a surface, a mechanical device, etc.), sound in the physical environment, textures of a real-world object, etc. Some implementations also maintain representations for anything in the virtual world model that can be seen through viewport(s) in the physical environment.

The first virtual world client 205, the Nth virtual world client 206, the individual virtual world client 215, and the virtual world server 201 can be similar to the computer 101 but configured consistent with the computer's role.

One aspect of the disclosed technology enables more realistic meetings between avatar controllers. One such aspect is the appearance that the remote and local meeting attendees are in the same physical environment. Another such aspect is that each meeting attendee can observe the social cues that occur between the attendees even if the attendees are in different physical environments. Yet another aspect is that much of the piloting of the avatar is automatically performed without explicit piloting commands from the avatar controller. One such environment (for example, the first physical environment 209) is illustrated by FIG. 3.

Figure 3:
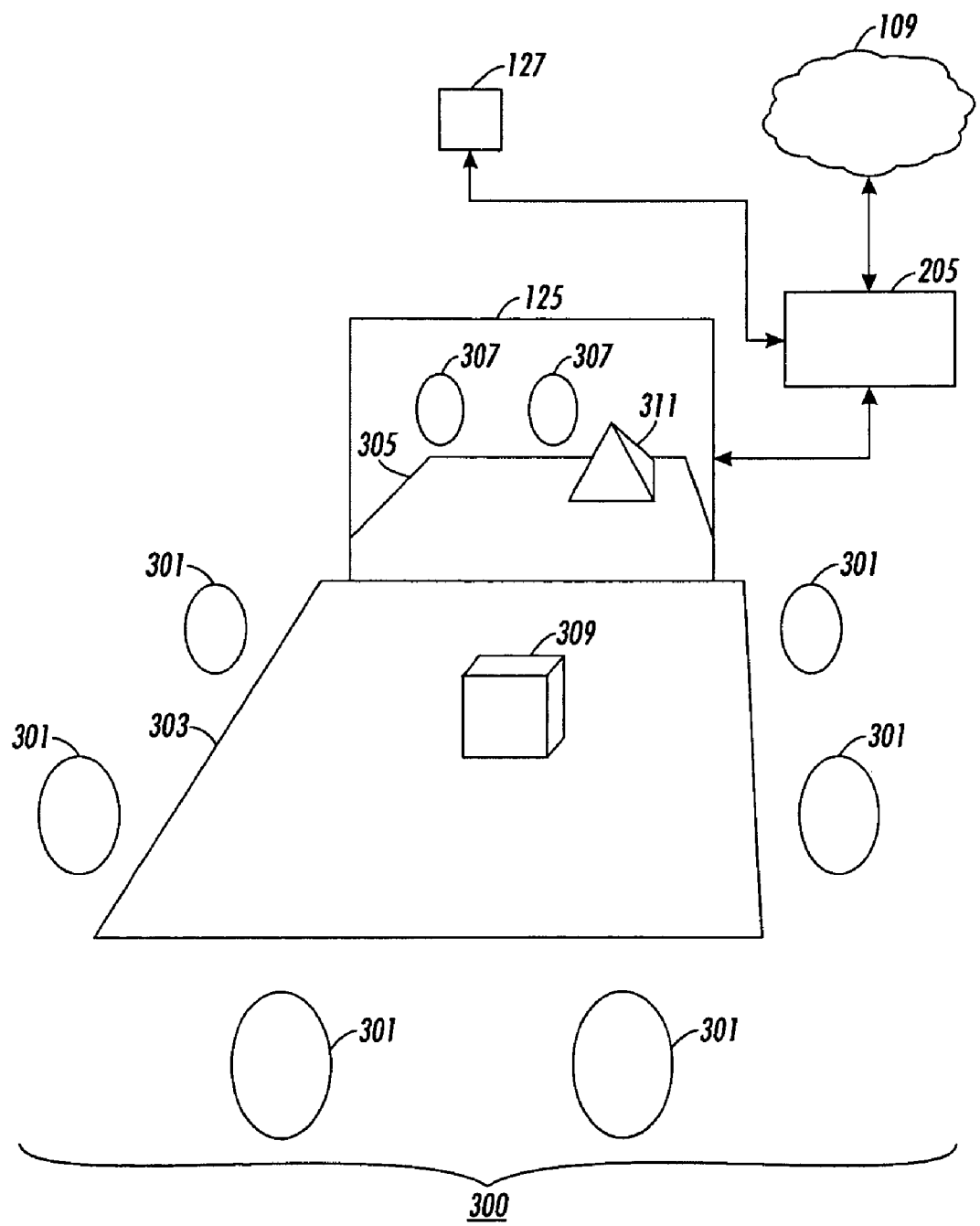
FIG. 3 illustrates a shared physical environment.

FIG. 3 illustrates a shared physical environment 300 that is enabled by the disclosed technology and is a more detailed representation of the first physical environment 209. The shared physical environment 300 is a physical space that can include, for example, the first virtual world client 205, the machine vision system instrumentation 127, and the viewport 125. The shared physical environment 300 can also include an avatar controller 301 (or a number of avatar controllers). For discussion purposes, the shared physical environment 300 can also include a physical table 303. In one implementation, the viewport 125 provides a viewpoint into the virtual world model 202 that can include a virtual table 305 and an avatar 307 (or a number of avatars). In addition, a real-world object 309 can be present in the shared physical environment 300, recognized in the first local environment model 207, and information about the real-world object 309 that can be propagated to the virtual world model 202. Though the viewport 125, the avatar controller 301 can view a virtual object 311 that may or may not have a corresponding real-world object in some other physical environment (that is, the virtual object 311 need not be a representation of a real-world object physically present in any of the physical environments feeding the virtual environment, but instead can be a representation of a virtual object maintained in the virtual world model 202).

Figure 4:
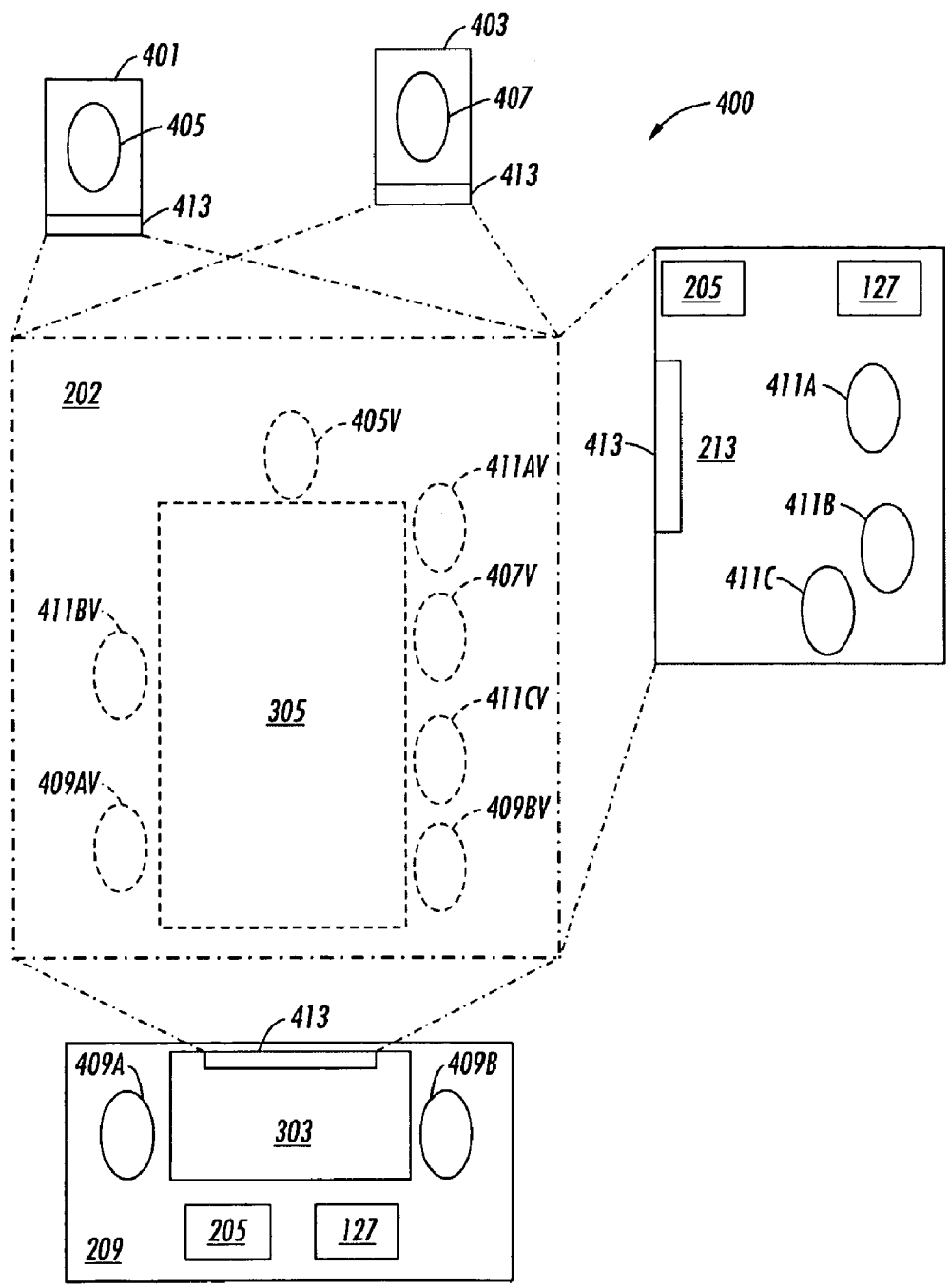
FIG. 4 illustrates a physical-virtual environment interface.

FIG. 4 illustrates a physical-virtual environment interface 400 that includes a representation of the first physical environment 209, the Nth physical environment 213, a first individual virtual world client 401 (for example, corresponding to the individual virtual world client 215) and a second individual virtual world client 403. The physical-virtual environment interface 400 can represent an architecture that can be used to achieve the shared physical environment 300 of FIG. 3.

The first individual virtual world client 401 can be used by a first avatar controller 405, and the second individual virtual world client 403 can be used by a second avatar controller 407. Also a first set of avatar controllers 409A-B can be physically co-located in the first physical environment 209 with the machine vision system instrumentation 127, and the physical table 303. Furthermore a second set of avatar controllers 411A-C can be physically co-located in the Nth physical environment 213. Each of the physical environments has at least one viewport 413 (for example, a computer display screen for the first avatar controller 405 and a large high-definition display for the Nth physical environment 213). Each viewport 413 provides a viewpoint from the respective physical environment into the virtual world model 202 (represented by the dash-dot box and lines).

Each of the avatar controllers pilots a corresponding avatar in the virtual world model 202 (in FIG. 4, the corresponding avatar is labeled with the same reference identifier as assigned to the avatar controller with the character 'V' appended thereto). The physical table 303 can be located near the viewport 413 such that the physical table 303 and the virtual table 305 appear to be adjacent. However, the physical table 303 need not be so located. Dash-dot lines indicate one possible view into the virtual world model 202 from each viewport. As is well known in the art, the view of the virtual world model 202 for each viewport can be manipulated by changing the viewpoint from which the image in the viewport is generated.

Additional aspects of the technology are subsequently discussed within the context of FIG. 5. One skilled in the art will understand how to apply these aspects to the other physical environments and virtual world clients of FIG. 2, as well as to other similar environments and clients.

Figure 5:
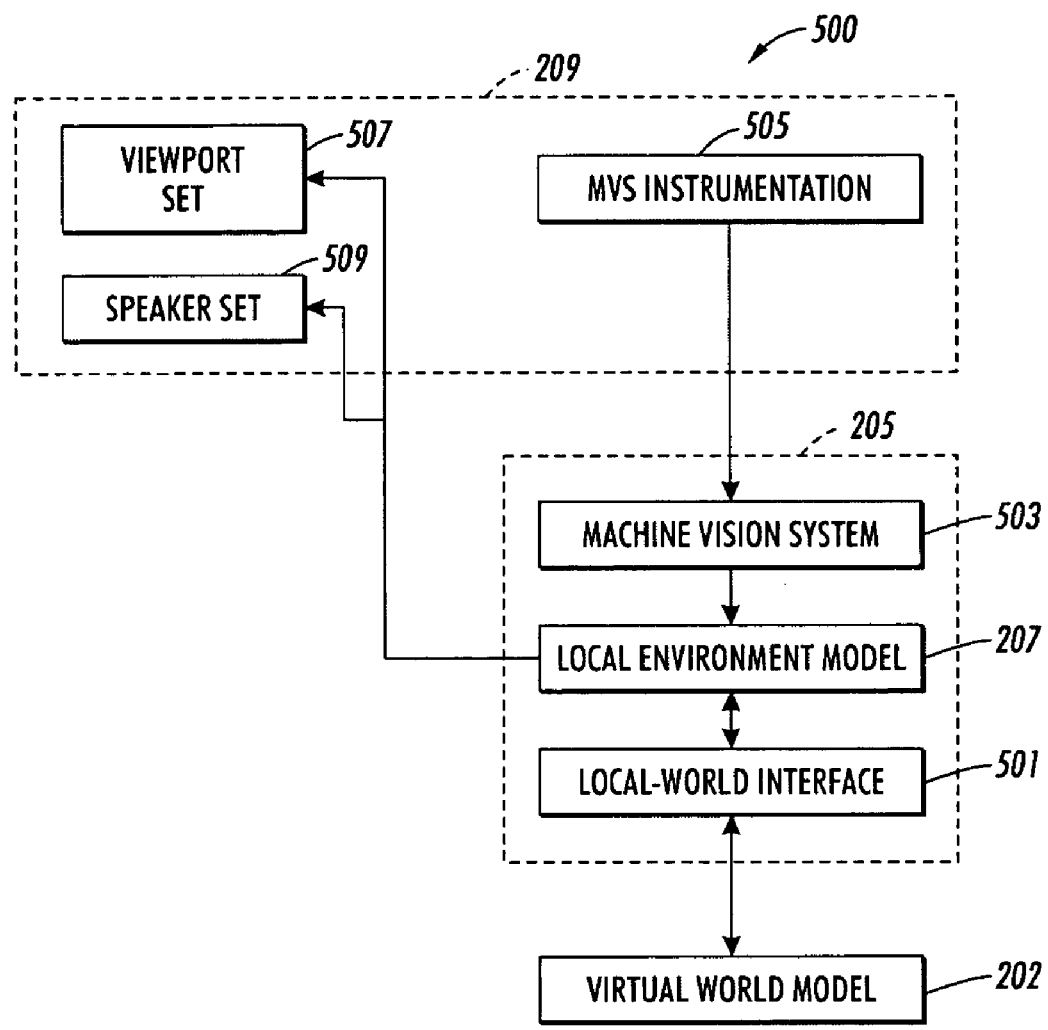
FIG. 5 illustrate a virtual-world server/virtual-world client architecture.

FIG. 5 illustrates a virtual-world server/virtual-world client architecture 500 to further detail communications between the virtual world model 202 and the first physical environment 209. This discussion also applies to communications between the virtual world model 202 and the Nth physical environment 213 and the individual virtual world client 215. A local-world interface 501 serves as an interface for communications between the virtual world model 202 and the first local environment model 207. As is subsequently described, the local-world interface 501 maintains at least one transformation between the first local environment model 207 and the virtual world model 202.

The first local environment model 207 can be updated to reflect changes in the first physical environment 209. Changes in the first physical environment 209 can be detected using a machine vision system 503 that receives information about the first physical environment 209 from an instrumentation set 505. Changes in the first local environment model 207 resulting from inputs from the machine vision system 503 that can change the virtual world model 202 propagate through the local-world interface 501 to the virtual world server 201 as automatic piloting commands (generally as binary commands).

The piloting commands automatically emitted by the local-world interface 501 can be a set of textual piloting commands already implemented by the virtual world model 202 (and possibly by the virtual world client) for piloting avatars and other virtual objects. In addition, the local-world interface 501 can implement new textual or binary piloting commands to effectuate, for example but without limitation, a focus-on piloting command (identifying a source avatar and a target virtual object), a focus-off piloting command, an expression piloting command, a body-part-position piloting command, a move-to piloting command, etc. These or similar piloting commands can also be implemented in the virtual world model 202.

The capability of the machine vision systems can vary. This capability can extend from a gaze-tracker on a laptop computer configured to monitor a single avatar controller to a multi-camera sensor system configured to monitor a meeting room environment such as the first physical environment 209 or the Nth physical environment 213. In some implementations, the machine vision system 503 and the instrumentation set 505 implement a location recognition system that tracks the locations of the avatar controllers in the first physical environment 209, and that detects gazes of avatar controllers even if the avatar controllers are not in fixed locations in the first physical environment 209 (for the individual virtual world client 215, the avatar controller can be in a fixed location such as sitting in front of a viewport).

One skilled in the art will understand that sufficiently advanced versions of the instrumentation set 505 can include tactile feedback gloves (or other devices) to allow the avatar controller to "feel" as well as "see" a virtual object in the virtual world model 202. Such a one will also understand eye-tracking and gaze-tracking technology.

The first local environment model 207 can represent all relevant real-world objects that can be sensed by the instrumentation set 505. The information that can be acquired from the first local environment model 207 can include coordinates of individuals (including avatar controllers), body orientation, body-part orientation, facial features and expressions, and gaze information. In some implementations, the avatar controllers can be associated with audio data from their utterances (for example but without limitation, if the avatar controller wears a microphone). Some real-world objects in the first local environment model 207 that could be sensed by the instrumentation set 505 are not relevant to the first local environment model 207 and, thus, no corresponding virtual objects are maintained. Virtual object representations presented on a viewport from the first local environment model 207 can be treated as real-world objects on the viewport.

Each avatar controller's gaze can be tracked within their physical environment by the machine vision system. In some implementations, the machine vision system only need track the avatar controller's eye position to determine the gaze (for example, for a single avatar controller sitting at the individual virtual world client 215). The machine vision system can determine where on the avatar controller's display screen (the viewport) the avatar controller is focused. From the looked-at location on the viewport, the machine vision system can determine which virtual object representation the avatar controller has focused on. This focus can be mapped back to the piloted avatar in the virtual world model 202.

One skilled in the art will understand that the gaze-tracker tracks where the avatar controller is looking. If the avatar controller's gaze tracks a target over a period of time, the avatar controller has focused on the target. Transitory glances away from the target will not change the focus while a more substantial break in the tracking of the target indicates that the avatar controller is no longer focused on the target (has lost focus). As is subsequently described, a virtual gaze object can be instantiated, for example, in the first local environment model 207 responsive to the detection of when an avatar controller has acquired and lost focus. The avatar controller can focus on real-world objects (including other avatar controllers) in the physical environment as well as on virtual object representations displayed by a viewport in the physical environment, or on other targets. As used herein a target object is an object in the virtual environment that may or may not represent a real-world object. One skilled in the art will be able to distinguish between the terms "target" and "target object" from the context within which the terms occur. One implementation uses events such as a lost focus event, and an acquired focus event.

In more complex physical environments (such as the first physical environment 209), the machine vision system can track each relevant real-world object's location and orientation. In addition, the machine vision system can track whether an avatar controller has focused on a target (such as another avatar controller, a viewport, or other relevant real-world object in the first physical environment 209) by determining the avatar controller's gaze.

By tracking the gaze of an avatar controller in a physical environment, the machine vision system can instantiate a virtual gaze object to a target object in the local environment model. For example, a virtual gaze object can be instantiated in the first local environment model 207 when the machine vision system 503 has determined that an avatar controller has focused on a target. When the avatar controller is no longer focused on the target, the virtual gaze object can be destroyed. In response to focus events, the local-world interface 501 emits corresponding focus-on piloting commands and focus-off piloting commands to the virtual world model 202. For example, if a virtual gaze object is instantiated, the focus-on piloting command can cause an avatar eye of the avatar piloted by the avatar controller to aim at and track the avatar (or other virtual object) associated with the target. This orientation would then be seen in the viewports. While maintaining virtual gaze objects in the first local environment model 207 enables very responsive tracking of the target, some implementations can perform the tracking operation directly in the virtual world model 202.

The avatar eye is the avatar's pointing mechanism. The avatar eye can be aimed by rotating the avatar's body, body-part (for example, the head), the avatar eye in the mask, or some combination thereof.

To instantiate the virtual gaze object, the machine vision system can orient the avatar eye corresponding to the avatar controller's gaze and mathematically project a view cone around the gaze direction within the local environment model to determine whether the gaze of the avatar controller has intersected a target in the physical environment. The view cone can be generated by projecting a cone of rays from the avatar eye (of the avatar controller's avatar) at different discrete angles centered on the avatar controller's gaze to sample the local environment model. The intersection of each ray with virtual objects in the local environment model can be separately determined and the result aggregated. Each ray terminates once it has intersected a virtual object. The target object generally is selected from the virtual objects that have a sufficient intersection with the view cone. The target can be another avatar controller or real-world object (including an individual who is not an avatar controller) in the same physical environment, or the target can be a virtual object representation (including an avatar representation) presented on a viewport located in the physical environment.

In some implementations, the location recognition system can include a body-part tracker that recognizes body-part positions of the avatar controller such that the local-world interface 501 automatically emits body-part-position piloting commands to the virtual world model 202 such that the piloted avatar appropriately reflects the avatar controller's body-part positions.

In some implementations, the location recognition system can include a face-tracker that recognizes facial expressions or facial distortions of the avatar controller. In these implementations, the local-world interface 501 can automatically emit expression piloting commands to the avatar in the virtual world model 202. The expression piloting command can be implemented in many ways. One implementation recognizes facial distortions of the avatar controller and automatically emits an appropriate expression piloting command (for example: "/smiles slight", "/frown large", "/glare", etc.). Another implementation maintains an average of the avatar controller's features, and when the avatar controller's features sufficiently distort from the average, generates and sends a distortion vector field as part of the expression piloting command. In such an implementation, the virtual world model 202 would apply the distortion vector field to the avatar's mask. These expression piloting commands can also be implemented using mesh and bone techniques known to one skilled in the art.

The virtual world model 202 maintained by the virtual world server 201 can be viewed from within the first physical environment 209 from the viewpoint(s) assigned to a viewport set 507. The physical environment can include multiple viewports each with a separate viewpoint into the virtual world model 202. The separate viewpoints can be coordinated for multiple displays, or individually specified. The viewpoints can be placed near a piloted avatar but can also be placed to view a significant portion of the virtual world model 202. The viewport set 507 for the individual virtual world client 215 can be a personal computer display screen. In addition, audio can be presented in the first physical environment 209 through a speaker set 509 (such as area speakers, headphones, and/or group headphones).

The viewport set 507 and the speaker set 509 are driven from the first local environment model 207 and the real-world objects modeled within. A view into the virtual world model can be provided to an individual or avatar controller through the viewport set 507. The viewport set 507 can be controlled by the first local environment model 207. A two-dimensional image of the virtual world model can be projected on a two-dimensional display screen from a viewpoint (often referred to as a camera position) in the virtual world model (which is at least a three-dimensional environment). The resulting presentation of the virtual object representation indicates how the corresponding virtual object is oriented in the virtual world model. Thus, the avatar representation indicates how the avatar is oriented. Some two-dimensional display screens can be configured such that the viewport provides a three-dimensional window into the virtual world model (for example, using 3-D glasses). A true three-dimensional display device can directly render the virtual world model in the viewport as a view-tank.

The local-world interface 501 maintains transformations between the first local environment model 207 and the virtual world model 202. The local-world interface 501 automatically emits piloting commands to the virtual world model 202 when the first local environment model 207 changes in a manner that would change the virtual world model 202. In addition, the local-world interface 501 transforms the virtual world model 202 into the first local environment model 207.

In a physical environment (such as the first physical environment 209) where the machine vision system can track the avatar controller's location in the physical environment as well as the location of the viewport(s), the machine vision system can provide information to the first local environment model 207 such that the first virtual world client 205 can detect when an avatar controller is focused on another avatar controller, real-world object, or viewport. The first local environment model 207 can also normalize the locations in the first physical environment 209 to that of the avatars in the virtual world model 202. Thus, avatar controllers can physically move around the first physical environment 209 while their corresponding avatars remain at their assigned locations in the virtual world model 202. However, nearness relationships (and the like) between a real-world object and an avatar controller in the first physical environment 209 can be maintained in the virtual world model 202 such that, for example, when a real-world object is passed between avatar controllers in the virtual world model 202, the virtual object corresponding to the real-world object is also passed between the corresponding avatars.

The previously disclosed technology automatically interfaces the physical environments to the virtual world model 202 maintained by the virtual world server 201. For example, the virtual world model 202 can include a first avatar that represents a first avatar controller in the first physical environment 209, a second avatar that represents a second avatar controller in an Nth physical environment 213, and a third avatar that represents a third avatar controller. The first physical environment 209 can include a gaze-tracker and the viewport set 507. The Nth physical environment 213 can include a second viewport (not shown). Each of the avatars includes an avatar eye (a body-part) that represents the origin of a virtual gaze object that indicates the direction the avatar is looking. The avatar eye can be rendered on a viewport as one or more representations of a light sensor (such as an eye, eyeball, a robotic camera, a sight vector, a text box, or anything that suggests the virtual gaze object direction of the avatar"). The avatar eye can be aimed by piloting commands that manipulate the avatar's body, or body-part. The avatar can be commanded to track a virtual object so that the avatar and/or the avatar eye can be automatically positioned to aim at a target object.

Additional aspects of the technology are subsequently discussed within the context of FIG. 5. One skilled in the art will understand how to apply these aspects to the other physical environments and virtual world clients of FIG. 2.

Figure 6:
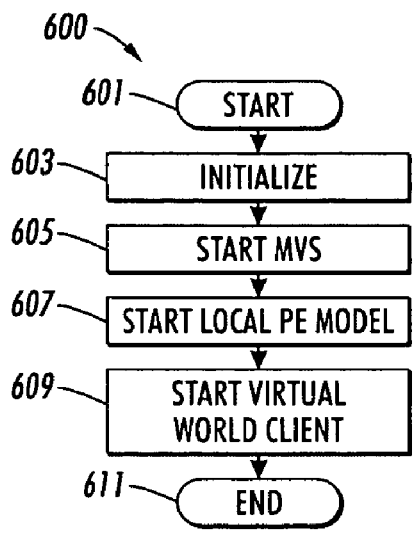
FIG. 6 illustrates a start virtual world client process.

FIG. 6 illustrates a start virtual world client process 600 that initiates at a start terminal 601 responsive to invocation resulting from a user action, power-on event, timer event, etc. The start virtual world client process 600 continues to an 'initialize' procedure 603 that performs any needed initialization. The start virtual world client process 600 continues to a 'start machine vision system' procedure 605 that invokes the machine vision system 503, a 'start local environment model' procedure 607 that invokes the first local environment model 207, and a 'start virtual world client' procedure 609 that invokes the local-world interface 501. The start virtual world client process 600 completes through the end terminal 611. One skilled in the art will understand that there is a multitude of ways to perform the invocations. Such ways can include initiating tasks, threads, etc.

The machine vision system can initialize the instrumentation set 505 and acquire physical environment information for the first local environment model 207. Eventually, the local-world interface 501, the first local environment model 207, and the machine vision system 503 become synchronized with the virtual world model 202.

Figure 7:
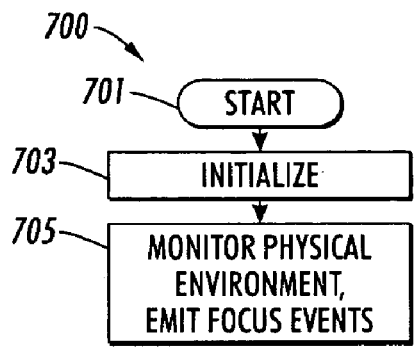
FIG. 7 illustrates a focus event detector process.

FIG. 7 illustrates a focus event detector process 700 that can be a component of the first local environment model 207 or the machine vision system 503. It is invoked appropriately, initiates at a start terminal 701 and performs any needed initialization at an 'initialization' procedure 703. Next the focus event detector process 700 continues to a 'monitor physical environment' procedure 705 that detects when an avatar controller acquires focus on a target or loses focus on the target in the first local environment model 207. As focus is acquired or lost, the 'monitor physical environment' procedure 705 issues appropriate focus events that can be processed as subsequently described, for example, with respect to FIG. 8 and FIG. 9.

Focus can be acquired when an avatar controller has tracked a target for some period of time. Once focus is acquired and a virtual gaze object is instantiated in the first local environment model 207 between the avatar controlled by the avatar controller and the target of the virtual gaze object, the 'monitor physical environment' procedure 705 can monitor the virtual gaze object to determine whether the virtual gaze object no longer intersects the target (for example, by the avatar controller failing to track the target). Once the view cone no longer sufficiently intersects the target, the 'monitor physical environment' procedure 705 issues a lost focus event. In some implementations, a hysteresis function is applied to control spurious focus events resulting from glances. In addition, some implementations use a prediction function to limit events that would result from transient occlusions of the target.

In some implementations, the 'initialization' procedure 703 (or other initialization process) can use information from the instrumentation set 505 to initialize the first local environment model 207. This initialization can include recognizing and locating real-world objects in the first physical environment 209 such as individual viewports in the viewport set 507, surfaces, individuals, avatar controllers (including automatically associating an avatar controller with an avatar), etc. For example, in some implementations, the first local environment model 207 and/or the first virtual world client 205 can prompt the users to assign avatars to avatar controllers. An individual in the first physical environment 209 can be assigned as an avatar controller of an avatar in the virtual world model. This assignment can be automatic or explicit. Where the physical environment comprises an individual sitting in front of a computer display equipped with a gaze-tracker (for example, a individual using a laptop or desktop computer—as in the individual virtual world client 215), the avatar controller can be, for example, automatically assigned to an avatar based on the login account used for the computer). In a more complex physical environment (for example, the shared physical environment 300), the assignment of an avatar controller to an avatar can be performed, for example, by associating an individual's name with an avatar; by an individual pointing at an avatar menu; by the use of a bar code, RFID tag, employee badge, and the like worn by the avatar controller; by using automatic facial recognition of the avatar controller; and the like.

Figure 8:
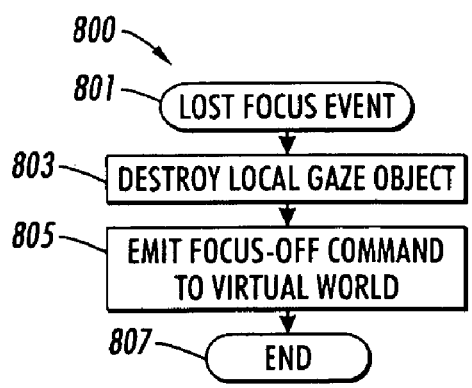
FIG. 8 illustrates a lost focus event handler process.

FIG. 8 illustrates a lost focus event handler process 800 that initiates at a start terminal 801 responsive to a lost focus event issued from the 'monitor physical environment' procedure 705 and that continues to a 'destroy local gaze object' procedure 803 that deletes the virtual gaze object in the first local environment model 207. The lost focus event handler process 800 continues to an 'emit focus-off piloting command to virtual environment' procedure 805 that emits a focus-off piloting command that relieves the avatar that was the origin of the virtual gaze object from tracking the target object in the virtual world model 202. The lost focus event handler process 800 can then exit through an end terminal 807. Once the virtual world model 202 has processed the focus-off piloting command, the avatar no longer tracks the former target object and the corresponding virtual gaze object can be deleted in the virtual world model 202.

Figure 9:
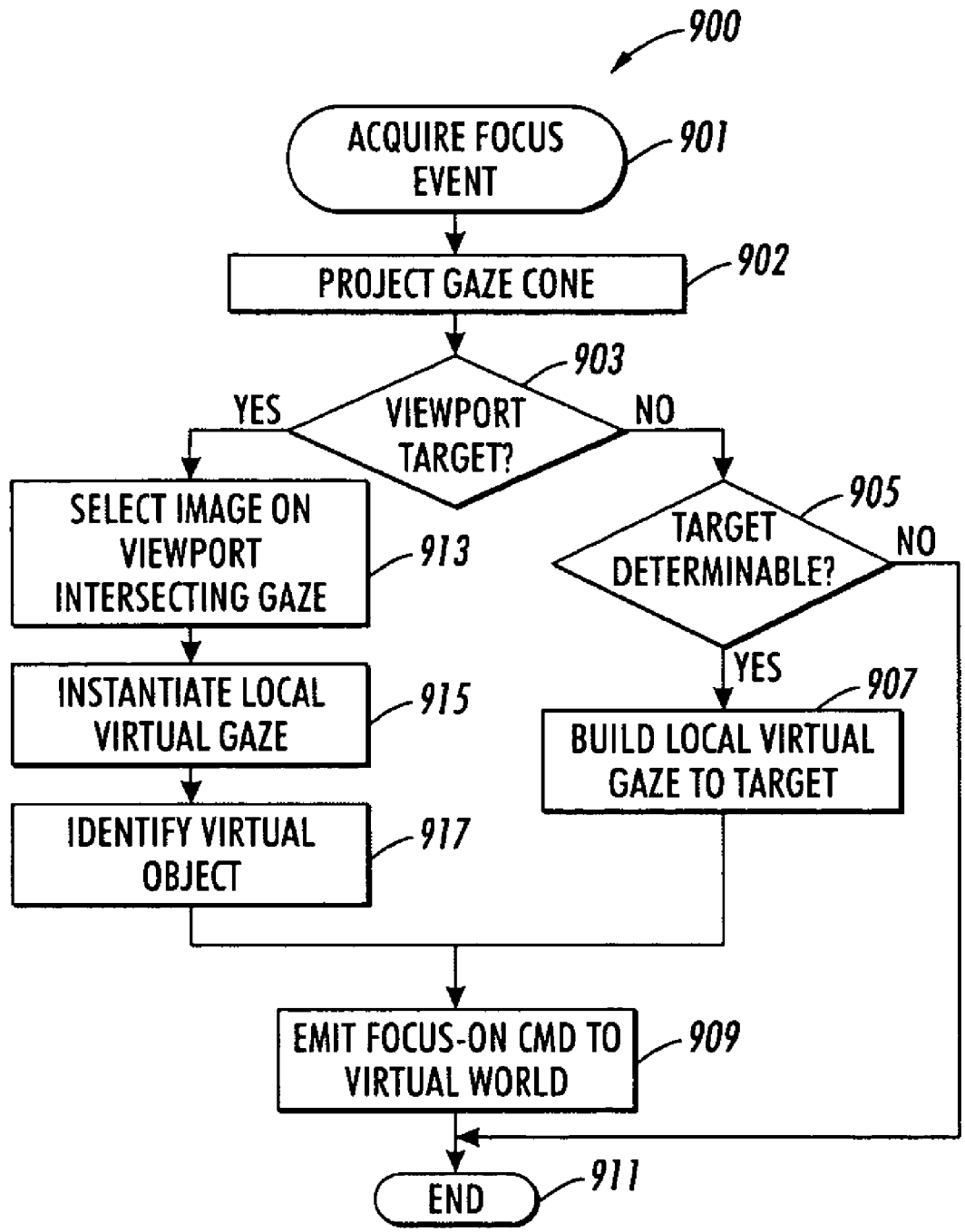
FIG. 9 illustrates an acquire focus event handler process.

FIG. 9 illustrates an acquire focus event handler process 900 that initiates at a start terminal 901 responsive to an acquire focus event issued from the 'monitor physical environment' procedure 705 and continues to a 'project gaze cone' procedure 902. The 'project gaze cone' procedure 902 determines from the acquire focus event which avatar controller caused the acquire focus event, determines the gaze of the avatar controller, and projects a view cone around the gaze from the avatar eye that represents the avatar controller's eyes in the first local environment model 207.

Virtual objects in the first local environment model 207 that substantially intersect with the view cone can be selected. If no virtual object intersects with the view cone, the acquire focus event is spurious and is dismissed (not shown). Once the virtual object that represents a real-world object in the first physical environment 209 is selected, a virtual gaze object can be instantiated in the first local environment model 207 from the avatar eye to the targeted virtual object.

The acquire focus event handler process 900 continues to a 'viewport' decision procedure 903 that determines whether the view cone substantially terminates with a virtual object that represents a viewport in the first physical environment 209 (note that if another real-world object is between the viewport and the avatar controller and occludes the viewport, the view cone may not substantially terminate on the virtual viewport object).

If the view cone does not substantially terminate on the virtual viewport object, the target is some other real-world object in the first physical environment 209 (such as an avatar controller or other real-world object). The acquire focus event handler process 900 continues to a 'target determinable' decision procedure 905 that determines whether the view cone substantially terminates on a virtual object in the first local environment model 207 that corresponds to a real-world object in the first physical environment 209. If the view cone substantially terminates on such a virtual object, then that virtual object is the target object. The acquire focus event handler process 900 then continues to an 'instantiate local gaze object to target' procedure 907 that instantiates a new virtual gaze object in the first local environment model 207 that extends from the avatar eye to the target object.

Once the virtual gaze object is instantiated, the acquire focus event handler process 900 continues to an 'emit focus-on piloting command to virtual world server' procedure 909 to automatically send a focus-on piloting command to the virtual world server 201. The acquire focus event handler process 900 completes through an end terminal 911.

On receipt of the focus-on piloting command, the virtual world model 202 conditions the avatar of the avatar controller to track the target object in the virtual world model 202. The virtual world model 202 can implement this piloting command by creating its own virtual gaze object from the avatar eye to the target object, or using other techniques to cause the avatar to track the target object. This virtual gaze object is used to cause the avatar eye to aim at the target object. The avatar eye can be aimed by orienting the avatar, the avatar's mask, and/or the avatar eye to align with this virtual gaze object. If this virtual gaze object direction should change, the avatar eye can be re-aimed while the avatar is focused on the target object. In addition, the avatar's mask can be distorted to indicate that the avatar controller has focused on a target object.

The target object in the virtual world model 202 can be an avatar piloted by some other avatar controller, a virtual object that represents a real-world object, a simulated interact-able object, and the like.

If the 'target determinable' decision procedure 905 determines that the view cone does not substantially terminate on a virtual object, the acquire focus event handler process 900 continues to the end terminal 911 without any virtual gaze object creation and without executing the 'emit focus-on piloting command to virtual world server' procedure 909.

If the 'viewport' decision procedure 903 determines the view cone substantially terminates on a virtual object that represents a viewport, the acquire focus event handler process 900 continues to a 'select avatar representation on viewport' procedure 913 that determines a patch on the viewport where the view cone terminates. As previously mentioned, virtual object representations presented on a viewport from the first local environment model 207 can be treated as real-world objects positioned on the viewport. If any of the virtual object representations are presented in the viewport at that patch, the virtual objects representing the virtual object representations are selected as target objects. If the patch on the viewport is a sufficient fraction of the viewport area, each virtual object representation presented on the viewport can be selected as a target object in the first local environment model 207. If the machine vision system 503 and the instrumentation set 505 are sufficiently capable, a gaze-tracking history can be used to further refine the set of target objects.

Once a set of target objects in the first local environment model 207 is selected, an 'instantiate local gaze object to avatar representation' procedure 915 generates virtual gaze objects that extend from the avatar eye to each targeted virtual object representation in the first local environment model 207. These virtual gaze objects are equivalent to virtual gaze objects between the avatar controller and a real-world object in the first local environment model 207.

Once the virtual gaze object(s) is instantiated in the first local environment model 207, an 'identify avatar representation' procedure 917 associates the targeted virtual object representation with the virtual object in the first local environment model 207 that was the source of the virtual object representation (for example, by using a field in the targeted virtual object representation that identifies the virtual objects in the first local environment model 207 and/or the virtual world model 202). These virtual objects are the ones the avatar controller has focused on. Next the acquire focus event handler process 900 continues to an 'emit focus-on piloting command to virtual world server' procedure 909 to emit focus-on piloting commands for each virtual gaze object as previously discussed.

One skilled in the art will understand that the 'viewport' decision procedure 903 is an optimization. The increased resolution needed by the gaze-tracker to determine which virtual object representation on the viewport an avatar controller is focused on could overload some embodiments of the virtual world client. However, with a sufficiently powerful virtual world client, this optimization is not needed because the virtual object representations presented on the viewport are treated as real-world objects in the physical environment.

The virtual world model 202, on receiving multiple focus-on piloting commands directed to a given avatar, can either pick the most recent focus-on piloting command, determine a compatible aim from the set of focus-on piloting commands, or otherwise determine the direction of the avatar eye.

By determining the local virtual gaze object, the local environment model can automatically emit a focus-on piloting command to the virtual world model 202 to cause the avatar piloted by the avatar controller to aim the avatar eye toward and start tracking the target object. Thus, when an avatar controller focuses on a target, the virtual world model 202 automatically aims the avatar eye of the piloted avatar toward the target such that the avatar eye tracks the target object. Tracking continues until the virtual world model 202 receives a focus-off piloting command for that piloted avatar.

After the virtual world server updates, responsive to the focus-on piloting command, each virtual world client that is presenting an avatar representation of the avatar is updated to show the new placement of the avatar eye. Thus, other individuals will be able to see when one avatar looks at a virtual object (such as another avatar) without regard to whether the avatar controller is looking at a real-world object or looking at a virtual object representation on a viewport in the same physical environment.

In some embodiments, if the avatar controller is looking at an avatar representation of an avatar piloted by an avatar controller located in a different physical environment, the avatar representation of the avatar controller on the other avatar controller's viewport can appear to track the other avatar controller. For example, when receiving the virtual gaze object between avatars, and where the target avatar's avatar controller is in the first physical environment 209, the first local environment model 207 can instantiate a virtual gaze object extending from the avatar representation of the "looking" avatar on the viewport set 507 to the avatar controller for the target avatar. From this virtual gaze object, the first local environment model 207 can present the avatar representation on the viewport set 507 such that the avatar eye of the "looking" avatar appears to track the target avatar controller in the physical environment. This allows the tracked avatar controller to determine that the "looking" avatar controller, has focused on the tracked avatar controller. Notice, that if the tracked avatar controller should focus on the avatar representation of the "looking" avatar controller the two avatar controllers will have established an "eye-to-eye" social cue.

Furthermore, when the virtual world model 202 is observed through a viewport by an individual who is not a party to the virtual gaze object, that individual will be able to see the social cue that the avatar controller has focused on the target. In other words, the individual will be able to observe what an avatar controller is gazing at. Thus, an observer can detect whether the avatar controller is looking at another avatar controller or real-world object in the same physical environment, at a virtual object representation of an avatar or real-world object in another physical environment that is presented on a viewport, or at a virtual object representation of a virtual object that is modeled in the virtual world model 202. The observer can be: an individual viewing some or all of the virtual world model 202 through a viewport, an avatar controller that is being looked at by another avatar controller, or an avatar controller observing two avatars.

In some physical environments the avatar controller's facial expression and/or body-part orientation can also be tracked. In these physical environments, the position of the avatar controller's body-parts (such as the limbs, head, facial features, etc), as well as the gaze can be monitored so that avatar controller's avatar can be correspondingly adjusted so that body movements of the avatar controller can be automatically applied to the avatar. If the avatar has a mask and the instrumentation set 505 includes a face-tracker, the avatar's mask can be distorted to correspond to the facial expression of the avatar controller.

As used herein, a procedure is a self-consistent sequence of steps that can be performed by logic implemented by a programmed computer, specialized electronics or other circuitry, or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic or combination of the foregoing. In particular, the methods and processes described herein can be implemented with logic modules.

One skilled in the art will understand that the network carries information (such as informational data as well as data that defines a computer program). The information can also be propagated using a carrier-wave. Signals capable of propagating the information include electromagnetic signals, visible or invisible light pulses, signals on a data bus, or signals propagated over any wire, wireless, or optical fiber technology that allows information to be transmitted over a network. Programs and data are commonly read from both tangible physical media (such as a compact, floppy, or magnetic disk) and from a network. Thus, the network, like a tangible physical media, can be a computer-usable data carrier.

One skilled in the art will understand that the technology improves the experience of avatar controller to avatar controller interactions when within virtual environment situations.

From the foregoing, it will be appreciated that the technology has (without limitation) the following advantages:

1) Social cues between participants in a virtual conference who interact through avatars are automatically applied to the avatars in the virtual environment corresponding to those participants.

2) Social cues between participants in a virtual conference who are co-located in the same physical environment are automatically captured and applied to the avatars in the virtual environment corresponding to those participants.

3) Enables natural interaction between participants in a virtual environment without conscious piloting of avatars by the participants and without regard for whether the interaction is between participants co-located in the same physical environment, or whether the interaction is between a participant and an avatar of another participant (located in a different physical environment).

4) Reduces the chance of mistaken interpretations of interactions between participants.

5) Improves the efficiency of virtual conferences.

6) Detects which virtual object representation an avatar controller is looking at and automatically emits piloting commands to the avatar to focus on the corresponding virtual object.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. The foregoing descriptions of embodiments described herein have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the claims. The scope of the disclosed technology is defined by the appended claims.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims. Unless specifically recited in a claim, steps or components of claims should not be implied or imported from the specification or any other claims as to any particular order, number, position, size, shape, angle, color, or material.

The foregoing descriptions of embodiments of the technology have been presented only for purposes of illustration and description. They are not intended to be exhaustive or to limit the present claims to the forms disclosed. Accordingly, many modifications and variations will be apparent to practitioners skilled in the art. Additionally, the above disclosure is not intended to limit the present claims.

What is claimed follows:

1. A computer-controlled method for automatically interfacing a first physical environment and a second physical environment to a virtual world model, said virtual world model including a first avatar representing a first avatar controller in said first physical environment, a second avatar representing a second avatar controller in said second physical environment, and a third avatar representing a third avatar controller in the first physical environment, said first physical environment including a gaze-tracker and a first viewport, said second physical environment including a second viewport, said first avatar and said second avatar including a first avatar eye and a second avatar eye respectively, said method comprising:

detecting, within said first physical environment, a gaze from said first avatar controller to a gaze target, wherein the gaze target is the third avatar controller in the first physical environment;

determining that the third avatar is associated with said gaze target in the first physical environment; and automatically emitting a focus-on piloting command to said virtual world model, said focus-on piloting command configured to aim said first avatar eye to said third avatar in said virtual world model responsive to determining.

2. The computer-controlled method of claim 1, said method further comprising:

presenting a representation of said first avatar eye and a representation of said third avatar on said second viewport to indicate that said gaze is aimed at said third avatar controller.

3. The computer-controlled method of claim 1, wherein in response to determining that a second gaze target is an avatar representation of said third avatar presented on said first viewport, said method further comprises:

presenting a representation of said first avatar eye and a representation of said third avatar on said second viewport to indicate that said gaze is aimed at said avatar representation on said first viewport.

4. The computer-controlled method of claim 1, wherein in response to determining that a second gaze target is an avatar representation of said second avatar presented on said first viewport, said method further comprises:

presenting a representation of said first avatar eye on said second viewport to indicate that said first avatar eye is aimed at said second avatar controller.

5. The computer-controlled method of claim 1, wherein said first physical environment further comprises a body-part tracker, said method further comprising:

tracking a body-part of said first avatar controller by said body-part tracker;

automatically emitting a body-part-position piloting command to said virtual world model responsive to tracking; and positioning a corresponding body-part of said first avatar in said virtual world model responsive to said body-part-position piloting command.

6. The computer-controlled method of claim 1, wherein said first physical environment further comprises a face-tracker, said first avatar controller having a face, and said first avatar having a mask, said method further comprising:

tracking said face, detecting a facial distortion of said face;

automatically emitting an expression piloting command to said virtual world model responsive to detecting; and altering said mask responsive to said expression piloting command.

7. The computer-controlled method of claim 1, further comprising:

detecting a second gaze from said third avatar controller to a second gaze target; and automatically emitting a second focus-on piloting command to said virtual world model, said second focus-on piloting command configured to aim a third avatar eye at a virtual object that represents said second gaze target in said virtual world model.

8. An apparatus having a central processing unit (CPU) and a memory coupled to said CPU for automatically interfacing a first physical environment to a virtual world model, said virtual world model including a first avatar representing a first avatar controller in said first physical environment, a second avatar representing a second avatar controller, and a third avatar representing a third avatar controller in the first physical environment, said first avatar and said second avatar including a first avatar eye and a second avatar eye respectively, said apparatus comprising:

a network connection logic configured to communicate with said virtual world model;

a machine vision system logic configured to enable monitoring of one or more real-world objects in said first physical environment, said memory configured to maintain a local physical environment model of said first physical environment responsive to the machine vision system logic, the machine vision system logic further configured to enable a gaze-tracker, said gaze-tracker configured to detect a gaze from said first avatar controller to a gaze target, wherein the gaze target is the third avatar controller in the first physical environment;

a target determination logic configured to determine that the third avatar is associated with said gaze target in the first physical environment; and a pilot logic configured to automatically emit a focus-on piloting command over the network connection logic to said virtual world model, said focus-on piloting command configured to aim said first avatar eye to said third avatar in said virtual world model responsive to the target determination logic.

9. The apparatus of claim 8, wherein the target determination logic includes an association logic configured to associate said third avatar controller with the third avatar.

10. The apparatus of claim 8, wherein said virtual world model includes a virtual gaze object from said second avatar to said third avatar, and said local physical environment model is also responsive to said virtual world model, said apparatus further comprising:

a viewport logic configured to drive a first viewport in said first physical environment responsive to said local physical environment model and configured to present a representation of said second avatar eye and a representation of said third avatar on said first viewport responsive to said virtual gaze object.

11. The apparatus of claim 8, wherein said local physical environment model is also responsive to said virtual world model, said apparatus further comprising:

a viewport logic configured to drive a first viewport in said first physical environment responsive to said local physical environment model and configured to present an avatar representation of said second avatar, and wherein the target determination logic is further configured to detect from a second gaze that said avatar representation is said gaze target, and wherein the target determination logic includes an association logic configured to associate said avatar representation with said second avatar.

12. The apparatus of claim 8, wherein said local physical environment model is also responsive to said virtual world model, said virtual world model including a virtual gaze object from said second avatar to said first avatar, said apparatus further comprising:

a viewport logic configured to drive a first viewport in said first physical environment responsive to said local physical environment model and configured to present an avatar representation of said second avatar, said avatar representation including a representation of said second avatar eye, and wherein said local physical environment model is configured to orient said representation of said second avatar eye toward the first avatar controller in the first physical environment.

13. The apparatus of claim 8, wherein the machine vision system logic further comprises a body-part tracker configured to track a body-part of said first avatar controller and wherein the pilot logic is configured to automatically emit a body-part-position piloting command to said virtual world model responsive to the body-part tracker.

14. The apparatus of claim 8, wherein said first avatar controller has a face, and said first avatar has a mask, and the machine vision system logic further comprises a face-tracker configured to track said face, the machine vision system logic further comprising a facial distortion logic configured to detect a facial distortion of said face, and wherein the pilot logic is configured to automatically emit an expression piloting command to said virtual world model responsive to the facial distortion logic.

15. A computer-program product for automatically interfacing a first physical environment and a second physical environment to a virtual world model, said virtual world model including a first avatar representing a first avatar controller in said first physical environment, a second avatar representing a second avatar controller in said second physical environment, and a third avatar representing a third avatar controller in the first physical environment, said first physical environment including a gaze-tracker and a first viewport, said second physical environment including a second viewport, said first avatar and said second avatar including a first avatar eye and a second avatar eye respectively, comprising:

a non-transitory computer-usable storage medium providing instructions that, when executed by a computer, cause said computer to perform a method comprising:

detecting, within said first physical environment, a gaze from said first avatar controller to a gaze target, wherein the gaze target is the third avatar controller in the first physical environment;

determining that the third avatar is associated with said gaze target in the first physical environment; and automatically emitting a focus-on piloting command to said virtual world model, said focus-on piloting command configured to aim said first avatar eye to said third avatar in said virtual world model responsive to determining.

16. The computer-program product of claim 15, said method further comprising:

presenting a representation of said first avatar eye and a representation of said third avatar on said second viewport to indicate that said gaze is aimed at said third avatar controller.

17. The computer-program product of claim 15, wherein in response to determining that a second gaze target is an avatar representation of said third avatar presented on said first viewport, said method further comprises:

presenting a representation of said first avatar eye and a representation of said third avatar on said second viewport to indicate that said gaze is aimed at said avatar representation on said first viewport.

18. The computer-program product of claim 15, wherein said first physical environment further comprises a body-part tracker, said method further comprising:

tracking a body-part of said first avatar controller by said body-part tracker;

automatically emitting a body-part-position piloting command to said virtual world model responsive to tracking; and positioning a corresponding body-part of said first avatar in said virtual world model responsive to said body-part-position piloting command.

19. The computer-program product of claim 15, wherein said first physical environment further comprises a face-tracker, said first avatar controller having a face, and said first avatar having a mask, said method further comprising:

tracking said face, detecting a facial distortion of said face;

automatically emitting an expression piloting command to said virtual world model responsive to detecting; and altering said mask responsive to said expression piloting command.

20. The computer-program product of claim 15, wherein the method further comprises:

detecting a gaze from said third avatar controller to a second gaze target; and automatically emitting a second focus-on piloting command to said virtual world model, said second focus-on piloting command configured to aim a third avatar eye at a virtual object that represents said second gaze target in said virtual world model.

* * * * *